United States Patent
Rhine

(10) Patent No.: US 7,458,066 B2
(45) Date of Patent: Nov. 25, 2008

(54) COMPUTER SYSTEM AND METHOD FOR TRANSFERRING EXECUTABLES BETWEEN PARTITIONS

(75) Inventor: Scott A. Rhine, Frisco, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 670 days.

(21) Appl. No.: 11/068,659

(22) Filed: Feb. 28, 2005

(65) Prior Publication Data

US 2006/0195827 A1   Aug. 31, 2006

(51) Int. Cl.
  *G06F 9/45*   (2006.01)
  *G06F 9/46*   (2006.01)
(52) U.S. Cl. ....................... 717/136; 718/102
(58) Field of Classification Search ........................ None
  See application file for complete search history.

(56) References Cited

U.S. PATENT DOCUMENTS

| | | | |
|---|---|---|---|
| 5,504,670 A | | 4/1996 | Barth et al. |
| 5,539,883 A | * | 7/1996 | Allon et al. ................. 718/105 |
| 5,655,120 A | | 8/1997 | Witte et al. |
| 5,999,972 A | | 12/1999 | Gish |
| 6,298,370 B1 | | 10/2001 | Tang et al. |
| 6,343,280 B2 | | 1/2002 | Clark |
| 6,594,698 B1 | | 7/2003 | Chow et al. |
| 6,597,956 B1 | | 7/2003 | Aziz et al. |
| 6,721,747 B2 | | 4/2004 | Lipkin |
| 6,779,016 B1 | | 8/2004 | Aziz et al. |
| 6,985,937 B1 | | 1/2006 | Keshav |
| 7,203,944 B1 | * | 4/2007 | van Rietschote et al. .... 718/104 |
| 2002/0016812 A1 | * | 2/2002 | Uchishiba et al. ........... 709/104 |
| 2002/0091786 A1 | | 7/2002 | Yamaguchi et al. |
| 2002/0099759 A1 | | 7/2002 | Goothers |
| 2006/0123217 A1 | * | 6/2006 | Burdick et al. .............. 711/173 |

FOREIGN PATENT DOCUMENTS

EP   1577770   9/2005

* cited by examiner

*Primary Examiner*—Wei Y. Zhen
*Assistant Examiner*—Philip R. Wang

(57) ABSTRACT

In one embodiment, a computer system comprises a plurality of processors, first software code for registering executables, creating partitions, and assigning executables to partitions, wherein the first software code assigns non-registered executables to a first partition, second software code for monitoring a utilization rate associated with the first partition, examining executables of the first partition when the utilization rate exceeds a first limit, and transferring executables having accessed an amount of resources greater than a second limit to a second partition.

19 Claims, 2 Drawing Sheets

COMPUTER SYSTEM AND METHOD FOR TRANSFERRING EXECUTABLES BETWEEN PARTITIONS

TECHNICAL FIELD

The present application is generally related to a computer system and method for transferring executables between partitions.

BACKGROUND

Many enterprises have experienced a dramatic increase in the number of computers and applications employed within their organizations. When a business group in an enterprise deploys a new application, it is possible to add one or more dedicated server platforms to host the new application. This type of environment is sometimes referred to as "one-app-per-box." As more business processes have become digitized, a "one-app-per-box" environment leads to an inordinate number of server platforms. As a result, administration costs of the server platforms increase significantly. Moreover, the percentage of time that the server platform resources are actually used (the utilization rate) can be quite low. To address these issues, many enterprises have consolidated multiple applications onto common server platforms to reduce the number of platforms and increase the system utilization rates.

In such consolidated environments, certain executables may have undesired effects on other executables. For example, some executables can consume a significant amount of available resources (e.g., processor resources, memory resources, and disk input/output (10) resources). Other executables will then not be able to obtain sufficient resources to make adequate progress. Traditional methods to address this issue typically involve creating multiple groups to support the operations of respective groups of executables. The groups may be defined in a number of ways including by user login, user class, and application name. Limitations are also defined upon resources to be accessed by the various groups. The definition of groups in this manner generally prevents one executable from consuming a significant portion of all system resources. However, an executable can still consume a significant portion of the resources of its group.

SUMMARY

In one embodiment, a computer system comprises a plurality of processors, first software code for registering executables, creating partitions, and assigning executables to partitions, wherein the first software code assigns non-registered executables to a first partition, second software code for monitoring a utilization rate associated with the first partition, examining executables of the first partition when the utilization rate exceeds a first limit, and transferring executables having accessed an amount of resources greater than a second limit to a second partition.

In another embodiment, a method comprises registering executables of a computer system, assigning registered executables to a subset of a plurality of partitions, assigning non-registered executables to a first partition of the plurality of partitions, monitoring a utilization rate of system resources associated with the first partition, examining executables within the first partition when the utilization rate exceeds a first limit, and transferring executables having accessed an amount of resources greater than a second limit to a second partition of the plurality of partitions.

In one embodiment, a computer system comprises means for registering executables, means for assigning executables to a plurality of partitions of the computer system, wherein the means for assigning assigns non-registered executables to a first partition of the plurality of partitions, means for monitoring a utilization rate of the first partition, means for analyzing utilization rates of executables of the first partition, when the utilization rate of the first partition exceeds a first limit, and means for transferring executables from the first partition to a second partition for executables having the utilization rates greater than a second limit.

DETAILED DESCRIPTION

Some representative embodiments are directed to computer systems and methods that isolate "overaggressive" executables (executables that consume an undue amount of resources) to prevent the executables from degrading system performance. In some representative embodiments, a plurality of computing partitions are created. As used herein, a partition is a physical or logical mechanism for isolating operational environments within a single server or multiple servers. A scheduling agent assigns executables to respective partitions. Some executables may be registered with the scheduling agent. The registration process may involve communicating resource requests or service level agreements to the agent. The agent then responds by assigning the registered executable to a newly created partition that corresponds to the provided information. Furthermore, one of the partitions is designated as a default partition or a "common area" partition. The scheduling agent assigns executables that are not registered to the default partition. The default partition is assigned a predetermined amount of system resources. Another partition is used to isolate executables. This "isolation" partition is given a relatively smaller amount of resources. The smaller amount of resources ensures that isolated executables can make reasonable progress while not consuming resources needed by other executables.

In some embodiments, the scheduling agent monitors the default partition. The scheduling agent determines whether the utilization level associated with the default partition exceeds a predefined limit of the system resources. If the utilization level does not exceed the predefined limit, the scheduling agent allows executables within the partition to continue operations. However, if the predefined limit is exceeded, the scheduling agent analyzes the resource utilization by the individual executables within the partition. Executables that are identified as having one or several undesirable characteristics are immediately transferred to the isolation partition. A message is then sent to an administrator. The administrator may then decide whether to register the identified executables, leave the executables in the isolation partition, stop their execution, or perform any other suitable action.

Figure 1:
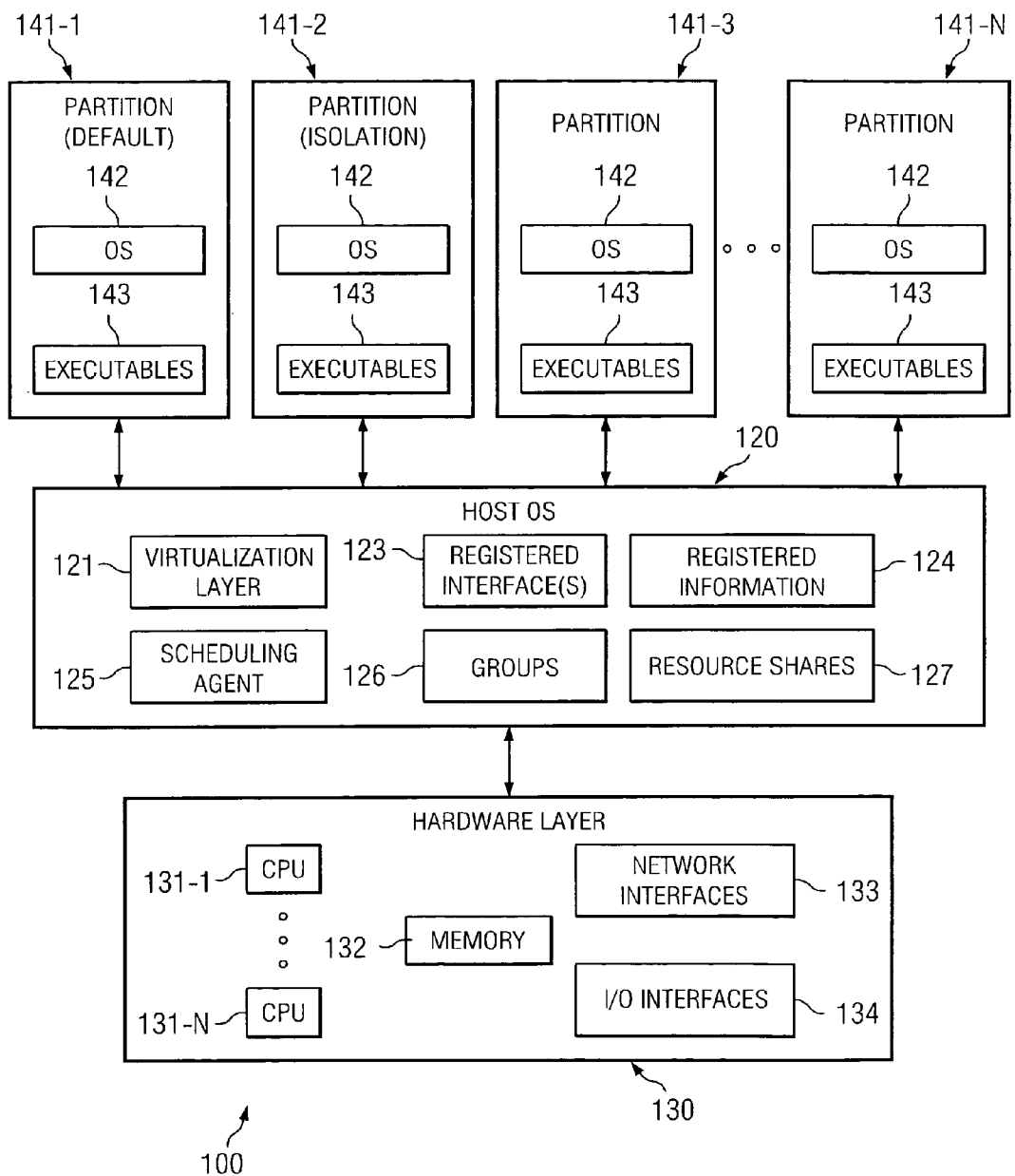
FIG. 1 depicts a computer system that isolates overaggressive executables according to one representative embodiment.

Referring now to the drawings, FIG. 1 depicts system 100 according to one representative embodiment. System 100 includes host operating system 120 that controls low-level access to hardware layer 130 of the platform. In one embodiment, host operating system 120 includes virtualization layer 121 within its kernel as an example. Virtualization layer 121 creates software constructs (logical devices) that correspond to the physical resources of hardware layer 130. Hardware layer 130 may include any number of physical resources such as CPUs 131-1 through 131-N, memory 132, network interfaces 133, and input/output (I/O) interfaces 134.

In one embodiment, virtual resources (e.g., one or several virtual CPUs, virtual memory, a virtual network interface card, a virtual I/O interface, etc.) are assigned to each partition 141-1 through 141-N. The number of virtual CPUs may exceed the number of physical CPUs 131. The CPU virtualization may be implemented by providing a set of registers, translation lookaside buffers, and other control structures for each virtual CPU. Accordingly, each partition 141 is isolated from other partitions 141. Additionally, each partition 141 is used to execute a respective guest operating system 142. The virtual resources assigned to the partition 141 appear to the guest operating system 142 as the hardware resources of a physical server. Guest operating system 142 may, in turn, be used to execute one or several executables 143. The executables 143 may be various user-space applications, system daemons, or any other suitable programs.

As shown in FIG. 1, partition 141-1 is the default partition. Specifically, executables that are not registered with scheduling agent 125 are assigned to the default partition. An appropriate amount of system resources may be assigned to the default partition to enable multiple executables to perform at satisfactory levels. Also, as shown in FIG. 1, partition 141-2 is the isolation partition. A relatively smaller amount of resources are assigned to partition 141-2. The smaller amount of resources are used to enable a limited number of isolated executables to make some amount of forward progress.

The other partitions (141-3 through 141-N) are used to support the operations of registered executables. Registration interface 123 may be used to register one or several executables with scheduling agent 125. Registration interface 123 may be accessed by suitable calls by the executable being registered. Alternatively, registration interface 123 can be accessed by an administrator through a command line interface or other suitable interface (not shown). Registration information 124 passed to registration interface 123 may include resource information or resource requests. For example, the resource information may include service level agreements that identify minimum access to processor resources and/or other resources. Scheduling agent 125 creates partitions 141 according to the resource information and assigns the executable(s) to a group corresponding to the newly created partition. The assignment of executables is reflected in group data 126. Also, scheduling agent 125 assigns executables that have not been registered to the default group.

Each group is supported by a respective partition 141 (partition 141-1 for the default group, partition 141-2 for the isolation group, and partitions 141-3 through 141-N for the registered groups). Scheduling agent 125 further schedules access to CPU resource 131-1 through 131-N by executables within the partitions 141 using resource shares 127. Resource shares 127 may define the amount of access to processor resources that each group will receive on average.

Additionally, scheduling agent 125 monitors the utilization of system resources by default partition 141-1. Specifically, scheduling agent 125 obtains the utilization rate associated with partition 141-1 by performing a suitable system call. If the utilization rate of partition 141-1 exceeds a predetermined amount, scheduling agent 125 may attempt to identify overaggressive executables within the default group. In some embodiments, scheduling agent 125 analyzes the executables in partition 141-1 in an ordered manner. For example, some executables (such as scheduling agent 125) are allowed to consume as much resources as requested by design. Those executables may be omitted from the analysis. Also, using prior knowledge, certain executables may be known to be more probable candidates. The analysis may begin with those executables. During the analysis, scheduling agent 125 may examine the utilization of each executable within one or several prior scheduling intervals. Based upon an executable's processor utilization within the interval(s) (as maintained by scheduling agent 125), scheduling agent 125 may classify the executable as an overaggressive executable.

If an overaggressive executable is identified, the identified executable is transferred from default partition 141-1 to isolation partition 141-2. The overaggressive executable will then not hinder the operations of other executables within the default group.

Upon transferring an executable to isolation partition 141-2, scheduling agent 125 generates a notification for the administrator. The administrator may then examine the executable to determine an appropriate response. For example, there may be a legitimate reason to allow the executable to obtain a greater amount of system resources. Accordingly, the administrator could register the executable thereby allowing the executable to be transferred to one of partitions 141-3 through 141-N. Alternatively, the administrator may stop further operations of the executable. The administrator may also simply leave the executable within isolation partition 141-2 until the executable completes its processing.

Figure 2:
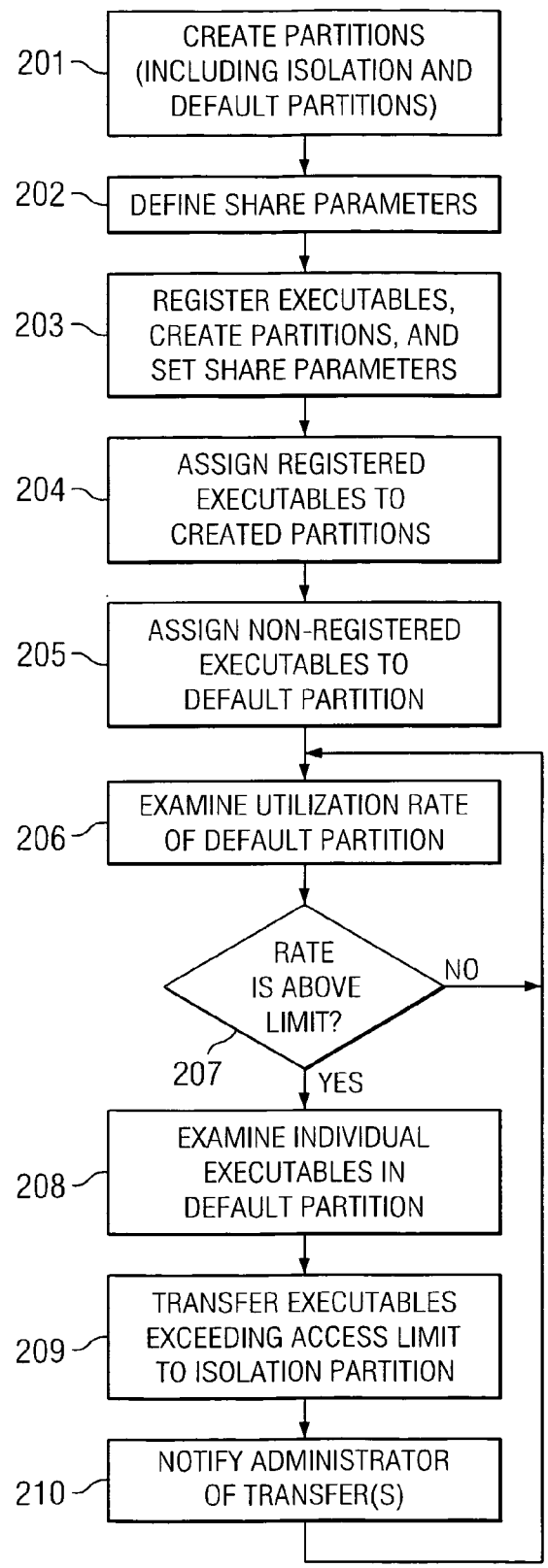
FIG. 2 depicts a flowchart for isolating overaggressive executables according to one representative embodiment.

FIG. 2 depicts a flowchart for isolating overaggressive executables according to one representative embodiment. The flowchart can be implemented, in part, using software code. For example, software code defining scheduling agent 125 and registration interface 123 can be used for the flowchart of FIG. 2. The software code can be stored on any suitable computer readable medium.

In block 201, a plurality of partitions are created including a default partition and an isolation partition. A partition is a physical or logical mechanism for isolating operational enviromnents within a single server or multiple servers. In block 202, share parameters are defined that are related to the amount of system resources (e.g., processor ticks) that each partition will receive, on average, within a scheduling interval. In block 203, executables are registered. The registration process may identify resource requests to support the various executables being registered. Upon the receipt of such resource requests, additional partitions are created and the executables are assigned to the newly created partitions (block 204). Share parameters are defined for the newly created partitions that correspond to the resource requests. Executables that are not registered are assigned to a default or common partition (block 205).

The utilization rate of the default partition is monitored (block 206). If the utilization rate is below a predefined limit (block 207), the process flow returns to block 206 to continue monitoring. In some embodiments, the repetitive monitoring of the default partition occurs when a scheduling agent is called by a system interrupt. In one embodiment, the monitoring performed by the scheduling agent occurs once per second and, hence, the overhead imposed by the scheduling agent is relatively low. If the utilization rate is greater than the predefined limit, the process flow proceeds to block 208.

In block 208, individual executables are examined to determine whether the executables can be identified as accessing an undue amount of resources. In one embodiment, executables within the default partition are examined to determine whether the executables have accessed an amount of processor resources (e.g., processor ticks) during the prior scheduling interval that is greater than a limit. In block 209, executables exceeding the limit are transferred to an isolation partition. In block 210, an administrator is notified of transferred executables (if any). From block 210, the process flow returns to step 206.

Some representative embodiments provide an efficient manner of monitoring the use of resources of a computer system and respond to such use. Specifically, some representative embodiments enable the effects of malicious programs (e.g., viruses) on other executables to be minimized. Moreover, other executables that may cause disruptive effects due to bugs, incompatibilities, or other issues may be identified and isolated. The identification of these executables may enable the system administrator to perform appropriate remediation to allow the executables to properly function without harming other executables. Additionally, these activities may be performed with relatively little overhead. Specifically, some representative embodiments need only monitor the utilization rate associated with a single group, or partition. Individual executables are not examined until an overaggressive executable actually begins to access an undue amount of resources.

What is claimed is:

1. A computer system, comprising:
 a plurality of processors;
 first software code for registering executables with a scheduling agent, creating partitions, and assigning executables to partitions, wherein said first software code assigns non-registered executables to a first partition;
 second software code for monitoring a utilization rate associated with said first partition, examining said non-registered executables of said first partition when said utilization rate exceeds a first limit, and transferring non-registered executables having accessed an amount of resources greater than a second limit to a second partition;
 wherein said first and second software code are associated with said scheduling agent that schedules executables on said plurality of processors.

2. The computer system of claim 1 wherein a share parameter is associated with each partition that is related to an amount of processor resources to be received by executables of the partition.

3. The computer system of claim 1 wherein said second software code generates a message for an administrator identifying a transferred executable.

4. The computer system of claim 1 wherein said first software code receives resource requests that identify an amount of resources to support an executable being registered.

5. The computer system of claim 1 wherein said second software code is executed once per second by said computer system.

6. The computer system of claim 1 wherein said utilization rate is a processor utilization rate.

7. A method, comprising:
 registering executables of a computer system with a scheduling agent;
 assigning registered executables to a subset of a plurality of partitions;
 assigning non-registered executables to a first partition of said plurality of partitions;
 monitoring a utilization rate of system resources associated with said first partition;
 examining said non-registered executables within said first partition when said utilization rate exceeds a first limit; and
 transferring non-registered executables having accessed an amount of resources greater than a second limit to a second partition of said plurality of partitions.

8. The method of claim 7 further comprising:
 setting share parameters for said plurality of partitions.

9. The method of claim 8 further comprising:
 scheduling executables of said plurality of partitions according to said share parameters.

10. The method of claim 8 wherein said registering executables includes communicating a resource request and wherein a share parameter is set to an amount defined by said resource request.

11. The method of claim 7 further comprising:
 generating a notification for an administrator identifying that an executable has been transferred to said second partition.

12. The method of claim 7 wherein said utilization rate is a processor utilization rate.

13. The method of claim 7 further comprising:
 registering an executable transferred to said second partition.

14. The method of claim 7 further comprising:
 ceasing operations of an executable transferred to said second partition.

15. A computer system, comprising:
 means for registering executables with a scheduling agent;
 means for assigning executables to a plurality of partitions of said computer system, wherein said means for assigning assigns non-registered executables to a first partition of said plurality of partitions;
 means for monitoring a utilization rate of said first partition;
 means for analyzing utilization rates of said non-registered executables of said first partition, when said utilization rate of said first partition exceeds a first limit; and
 means for transferring non-registered executables from said first partition to a second partition for non-registered executables having said utilization rates greater than a second limit.

16. The computer system of claim 15 further comprising:
 means for notifying an administrator that an executable has been transferred from said first partition to a second partition.

17. The computer system of claim 15 wherein a share parameter is associated with each partition that is related to an amount of processor resources to be received by executables of the partition.

18. The computer system of claim 17 wherein said means for registering receives resource information that defines an amount of resources requested to support an executable and sets a share parameter using said resource information.

19. The computer system of claim 15 wherein said utilization rate is a processor utilization rate.

* * * * *